United States Patent
Hirata

(10) Patent No.: US 8,240,919 B2
(45) Date of Patent: Aug. 14, 2012

(54) HYDROSTATIC BEARING PAD

(75) Inventor: Junichi Hirata, Iwata (JP)

(73) Assignee: NTN Corporation, Osaka (JP)

(*) Notice: Subject to any disclaimer, the term of this patent is extended or adjusted under 35 U.S.C. 154(b) by 301 days.

(21) Appl. No.: 12/667,657

(22) PCT Filed: Apr. 18, 2008

(86) PCT No.: PCT/JP2008/057592
§ 371 (c)(1),
(2), (4) Date: Jan. 4, 2010

(87) PCT Pub. No.: WO2009/004853
PCT Pub. Date: Jan. 8, 2009

(65) Prior Publication Data
US 2010/0183253 A1 Jul. 22, 2010

(30) Foreign Application Priority Data
Jul. 4, 2007 (JP) .................................. 2007-176133

(51) Int. Cl.
*F16C 32/06* (2006.01)
(52) U.S. Cl. ........................................ 384/100
(58) Field of Classification Search .................. 384/100, 384/107–120
See application file for complete search history.

(56) References Cited

U.S. PATENT DOCUMENTS
3,620,581 A * 11/1971 Heller et al. .................. 384/117
6,050,727 A * 4/2000 Messmer et al. ............. 384/117

FOREIGN PATENT DOCUMENTS
| JP | 63-231020 | 9/1988 |
| JP | 08-114230 | 5/1996 |
| JP | 2003-232352 | 8/2003 |
| JP | 2006-112497 | 4/2006 |

* cited by examiner

*Primary Examiner* — Thomas R Hannon
(74) *Attorney, Agent, or Firm* — McDermott Will & Emery LLP

(57) ABSTRACT

A hydrostatic bearing pad in which separation between a housing and a pad member and entry of an adhesive into an air supply groove are prevented to obtain stable bearing performance is provided. The hydrostatic bearing pad includes the pad member having a bearing surface forming a hydrostatic bearing and having air supply holes formed therein, and the housing bonded to the pad member with the adhesive. The air supply groove for supplying compressed gas to the pad member is formed in a surface of the housing bonded to the pad member in a manner corresponding to arrangement of the air supply holes. An adhesive inflow groove, is formed between a bonded portion, where the housing and the pad member are bonded to each other with the adhesive interposed therebetween and the air supply groove. The adhesive inflow groove, is formed along the air supply groove in the surface of the housing bonded to the pad member.

6 Claims, 4 Drawing Sheets

AIR SUPPLY

HYDROSTATIC BEARING PAD

RELATED APPLICATIONS

This application is the U.S. National Phase under 35 U.S.C. §371 of International Application No. PCT/JP2008/057592, filed on Apr. 18, 2008, which in turn claims the benefit of Japanese Application No. 2007-176133, filed on Jul. 4, 2007, the disclosures of which Applications are incorporated by reference herein.

TECHNICAL FIELD

The present invention relates to a hydrostatic bearing pad, and more particularly to a hydrostatic bearing pad for supporting a movable part with hydrostatic pressure of compressed gas supplied to a clearance between the pad and an opposed surface.

BACKGROUND ART

In the field of roller bearings conventionally used for supporting rotors, hydrostatic gas bearings are increasingly employed in order to achieve high-speed and high-accuracy rotation, low noise, low vibration, long life, and the like.

For example, a CT scanner in the field of medical diagnostic imaging uses a hydrostatic air bearing of a pad type (hydrostatic bearing pad) as a bearing for supporting a movable part, in order to improve rotation speed of a rotating gantry, achieve silence during rotation, prevent wear of a supporting part, and so on. Further, a precision working machine and a semiconductor exposure apparatus also use a hydrostatic bearing pad in order to position a working tool and a workpiece with high accuracy, prevent wear of a supporting part, and so on. A hydrostatic bearing pad is attached to at least one of a pair of opposed surfaces constituted of a movable part and a fixed part to form a hydrostatic bearing, with pressurized fluid being ejected from a nozzle or a narrow hole formed in the hydrostatic bearing pad toward the opposed surface.

A structure of such a hydrostatic bearing pad is proposed in Japanese Patent Laying-Open No. 63-231020 (Patent Document 1), for example. Japanese Patent Laying-Open No. 63-231020 (Patent Document 1) discloses a hydrostatic bearing pad including a porous bearing member and a housing engraved with air grooves for supplying pressurized air to the bearing member, in which the bearing member and the housing are bonded to each other with an adhesive on an outer circumferential surface of the bearing member and a raised surface formed between the air grooves of the housing.

Patent Document 1: Japanese Patent Laying-Open No. 63-231020

DISCLOSURE OF THE INVENTION

Problems to be Solved by the Invention

In the above conventional technique, the adhesive applied to the raised surface between the air grooves may run off to the air grooves in a lateral direction when the bearing member and the housing are bonded to each other, and clog the air grooves. Consequently, the pressurized air may be supplied unevenly to the porous bearing member, resulting in inability of the hydrostatic bearing to deliver its original performance.

Moreover, due to a small area of the raised surface between the air grooves, when the adhesive is applied to the raised surface in a small amount, a portion to which the adhesive was thinly applied may be deteriorated by internal stress generated by pressure of pressurized fluid and a change in temperature, resulting in separation between the housing and the bearing member.

Therefore, a main object of the present invention is to provide a hydrostatic bearing pad capable of obtaining stable bearing performance by preventing separation between a housing and a bearing member (hereinafter referred to as a pad member in the present invention) and preventing entry of an adhesive into an air groove (hereinafter referred to as an air supply groove in the present invention).

Means for Solving the Problems

A hydrostatic bearing pad according to the present invention is a hydrostatic bearing pad for supporting a rotor with hydrostatic pressure of compressed gas, and includes a pad member having a bearing surface forming a hydrostatic bearing, and a housing bonded to the pad member with an adhesive. An adhesive inflow groove is formed between a bonded portion where the housing and the pad member are bonded to each other with the adhesive interposed therebetween and an air supply path for supplying the compressed gas to the pad member. The adhesive inflow groove is formed in at least any one of a surface continuous with a surface of the housing bonded to the pad member and a surface continuous with a surface of the pad member bonded to the housing.

In this case, excessive adhesive running off from the bonded portion when the pad member and the housing are bonded to each other flows into the adhesive inflow groove formed between the bonded portion and the air supply path. As a result, entry of the adhesive into the air supply path during bonding can be prevented to avoid deterioration in performance of the hydrostatic bearing pad. The adhesive inflow groove may be formed in either the housing or the pad member, or may be formed in both.

The adhesive inflow groove and the bonded portion may be formed in an identical planar surface or curved surface. Alternatively, the adhesive inflow groove may be formed in a surface different from where the bonded portion is located, as long as it is formed within a surface where the housing and the pad member are in surface contact with each other which lies between the bonded portion where the housing and the pad member are bonded to each other and a location where the air supply path on the housing side and the air supply path on the pad member side are connected to each other (i.e., a surface continuous with the surface where the housing and the pad member are bonded to each other). That is, if the location where the air supply path on the housing side and the air supply path on the pad member side are connected to each other is in a surface different from where the bonded portion is located, the adhesive inflow groove and the location where the air supply path on the housing side and the air supply path on the pad member side are connected to each other may be formed in an identical surface.

Preferably, in the above hydrostatic bearing pad, the air supply path includes an air supply groove formed in at least any one of the surface continuous with the surface of the housing bonded to the pad member and the surface continuous with the surface of the pad member bonded to the housing. In this case, the adhesive inflow groove is formed between the bonded portion and the air supply groove in one surface or any of a plurality of surfaces where the housing and the pad member are in surface contact with each other, thereby preventing entry of the adhesive into the air supply groove during bonding to prevent deterioration in performance of the hydrostatic bearing pad.

Preferably, the pad member is a solid body including a plurality of air supply holes formed therein, each extending from the air supply groove to reach the bearing surface. In this case, the air supply holes formed in the pad member may be arranged in a rectangular shape, a circular shape, and the like in an outer periphery of the bearing surface when viewed two-dimensionally, in conformity with the shape of the bearing surface of the pad member. By forming the air supply groove in either the housing or the pad member in a manner corresponding to the arrangement of the air supply holes, the compressed gas can be supplied to the pad member.

If the pad member is formed as a porous body, air needs to be supplied evenly to the whole pad member in order to supply air evenly to the bearing surface. In that case, a large number of air supply grooves need to be formed in the contact surface between the housing and the pad member, resulting in a small area of the bonded portion. Consequently, separation at the bonded portion due to internal stress generated by pressure of the compressed gas and the like is likely. In contrast, with the pad member which is a solid body, the air supply groove should only be formed in a manner corresponding to the air supply holes. A large area for the bonded portion is thus ensured, thereby preventing occurrence of separation between the housing and the pad member.

Preferably, in the above hydrostatic bearing pad, the adhesive inflow groove is formed along the air supply groove. In this case, in the vicinity of the air supply groove, the adhesive inflow groove can be formed such that a direction in which the air supply groove extends and a direction in which the adhesive inflow groove extends are substantially the same. As a result, the area of the bonded portion can be made even larger.

Preferably, the adhesive inflow groove is formed to partition the bonded portion into a plurality of sections. When the bonded portion has a large area, the adhesive may not spread across the bonded portion when the housing and the pad member are bonded to each other, resulting in deterioration in bonding performance. For this reason, the bonded portion is partitioned into a plurality of sections by the adhesive inflow groove, so that the adhesive can spread easily across the bonded portion.

Preferably, an exhaust hole for bringing the adhesive inflow groove in communication with exterior space is formed in the housing, and the hydrostatic bearing pad further includes a sealing body for sealing an opening of the exhaust hole to the exterior space. In this case, when the housing and the pad member are bonded to each other, air can be exhausted through the exhaust hole, thereby preventing deterioration in bonding performance due to bubbles remaining in the bonded portion. Further, by sealing the opening of the exhaust hole to the exterior space after bonding, leakage of the adhesive to the outside and introduction of foreign objects into the hydrostatic bearing pad through the exhaust hole can be prevented.

Effects of the Invention

According to the hydrostatic bearing pad of the present invention, separation between the housing and the pad member can be prevented and entry of the adhesive into the air supply path can also be prevented, thereby obtaining stable bearing performance.

Figure 1:
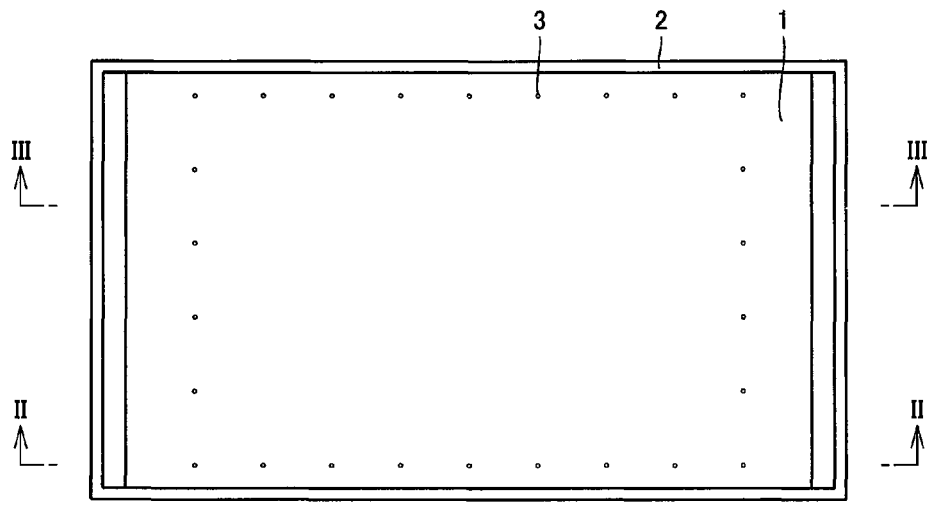
FIG. 1 is a plan view of a hydrostatic bearing pad of the present invention.

DESCRIPTION OF THE REFERENCE SIGNS 1 pad member; 2 housing; 3 air supply hole; 4 air supply groove; 5 air supply port; 6 ball stud; 7, 8 adhesive inflow groove; 9 distance; 10, 13 exhaust hole; 11, 12 bonded portion; 11a, 12a bonded surface of pad member; 11b, 12b bonded surface of housing; 14 bolt; 21 non-rotating part; 21a table support; 21b table base; 21c linear motion guide; 22 rotating shaft; 22a tip end surface; 22b bearing race; 22c outer circumferential surface; 23, 26 hydrostatic bearing pad; 24 ball stud; 29 radiation source; 30 collimator/shutter assembly; 31 radiation detector.

BEST MODES FOR CARRYING OUT THE INVENTION

In the following, an embodiment of the present invention will be described with reference to the drawings. It is noted that the same or corresponding components have the same reference characters in the drawings, and description thereof will not be repeated.

Figure 2:
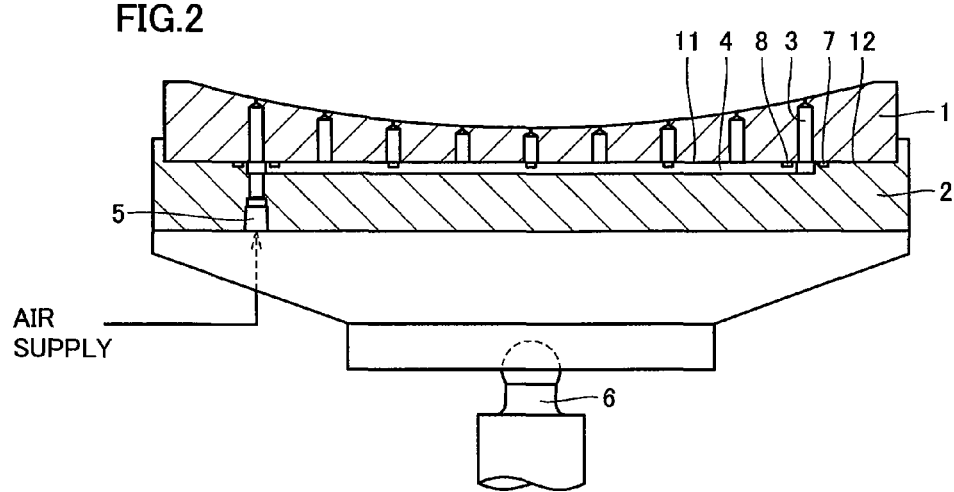
FIG. 2 is a cross-sectional view of the hydrostatic bearing pad along a line II-II in FIG. 1.

FIG. 1 is a plan view of a hydrostatic bearing pad of the present invention. FIG. 2 is a cross-sectional view of the hydrostatic bearing pad along a line II-II in FIG. 1. As shown in FIGS. 1 and 2, this hydrostatic bearing pad includes a pad member 1 made from a carbon solid body, a housing 2 for accommodating pad member 1 in a recess formed in a surface thereof, and a ball stud 6 for supporting housing 2 from a rear side of housing 2 opposite to the side for accommodating pad member 1.

As shown in FIG. 2, a surface forming a bearing surface of pad member 1 is formed as a curved surface having a curvature that corresponds to a curvature of an outer circumference of a rotor. Additionally, as shown in FIG. 2, a plurality of air supply holes 3 are formed in pad member 1, each extending from an air supply groove 4 to reach the curved bearing surface. Air supply holes 3 are arranged, as shown in FIG. 1, in a rectangular shape in the vicinity of an outer periphery of pad member 1 in a manner corresponding to pad member 1 which is rectangular in a two-dimensional shape. Pad member 1 may be formed from a metal material, and in that case, a metal surface forming the bearing surface may be subjected to surface treatment to have a lubricating property for use in order to prevent occurrence of seizure caused by accidental contact of pad member 1 with the rotor.

As shown in FIG. 2, air supply groove 4 is formed in the recess formed in the surface of housing 2. Air supply hole 3 is connected to air supply groove 4. Compressed gas is supplied in such a manner that it is successively introduced from a not-shown compressed gas source provided outside to an air supply port 5 and air supply groove 4, and then ejected from a narrowed opening of air supply hole 3 in the bearing surface.

A spherical or tapered recess is formed on the rear side of housing 2. A spherical tip end portion of ball stud 6 is inserted in the recess. As will be described later, when supporting a rotating part in a non-contact manner by fixing a base of ball stud 6 to a non-rotating part and arranging the bearing surface of pad member 1 opposite to the rotating part, for example, the hydrostatic bearing pad is coupled to the non-rotating part in a manner swingable with respect to the same by ball stud 6.

That is, as the hydrostatic bearing pad is supported with ball stud 6 being interposed, it is automatically adjusted to an optimal angle with respect to a position of the rotating part opposite to pad member 1.

Figure 3:
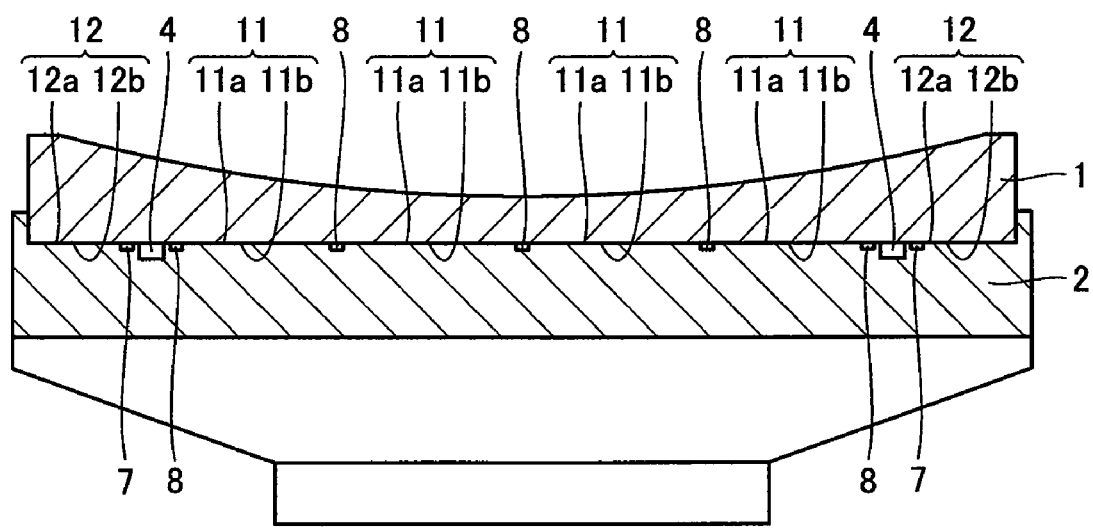
FIG. 3 is a cross-sectional view of the hydrostatic bearing pad along a line III-III in FIG. 1.
Figure 4:
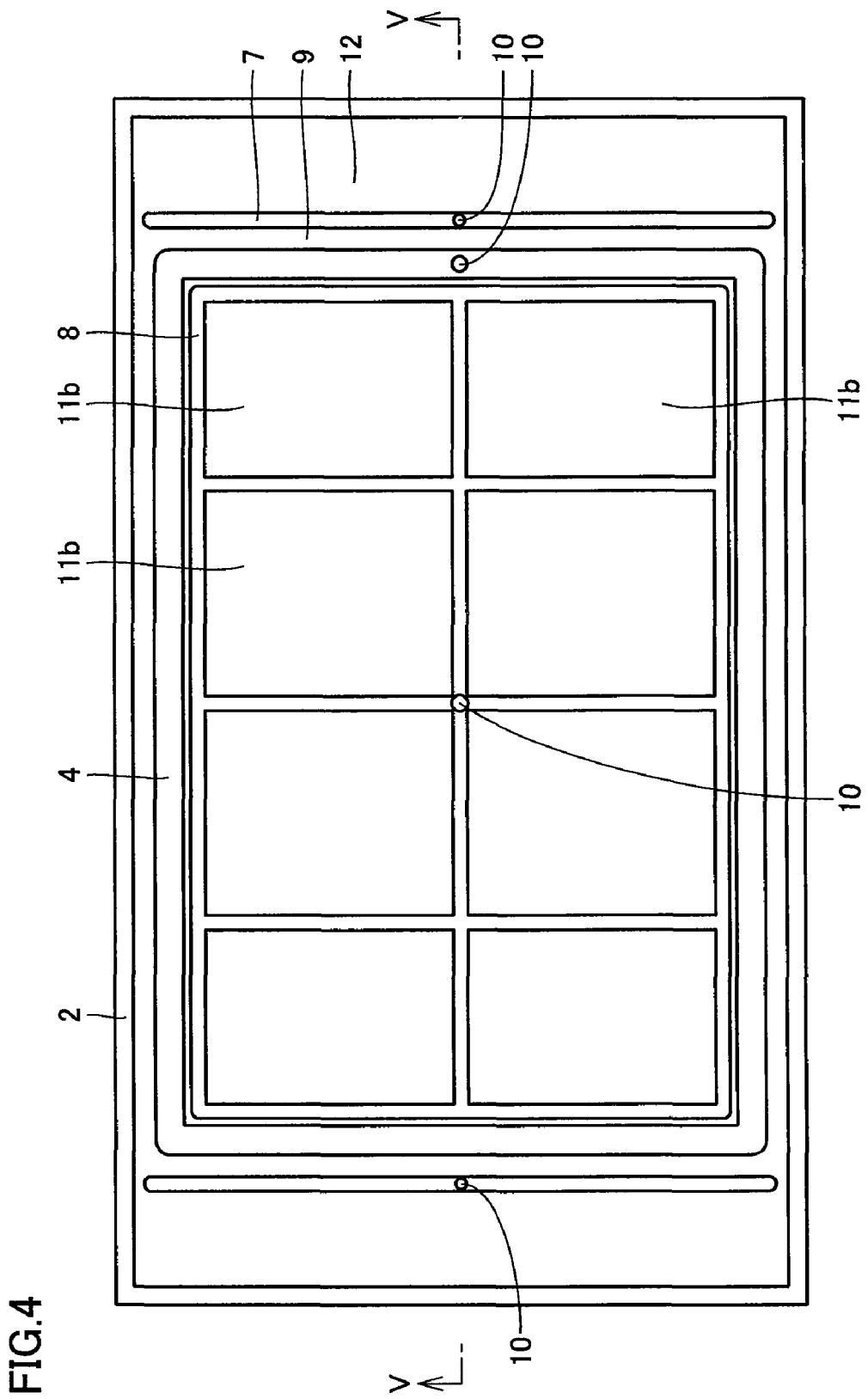
FIG. 4 is a plan view of a housing.

FIG. 3 is a cross-sectional view of the hydrostatic bearing pad along a line III-III in FIG. 1. FIG. 4 is a plan view of the housing. In FIG. 4, pad member 1 has been removed from the plan view of the hydrostatic bearing pad shown in FIG. 1. FIG. 4 therefore shows air supply groove 4 and adhesive inflow grooves 7, 8 formed in a bottom surface of the recess formed in the surface of housing 2 for accommodating pad member 1. Air supply groove 4 is formed in conformity with arrangement of air supply holes 3. That is, air supply groove 4 is formed in the surface of housing 2 in contact with pad member 1 in a rectangular shape, like the rectangular arrangement of air supply holes 3 (see FIG. 1) in conformity with pad member 1 which is rectangular in a two-dimensional shape.

In the bottom surface of the recess in the surface of housing 2, adhesive inflow groove 8 is formed on an inner side of rectangular air supply groove 4. Adhesive inflow groove 8 is formed to partition a bonded portion into a plurality of sections. Namely, as shown in FIG. 3, on the inner side of rectangular air supply groove 4, pad member 1 and housing 2 are bonded to each other with an adhesive interposed therebetween on a bonded surface 11*a* of the pad member and a bonded surface 11*b* of the housing, to form a bonded portion 11. Adhesive inflow groove 8 is formed between bonded surface 11*b* of the housing and air supply groove 4. As shown in FIG. 4, bonded surface 11*b* of the housing on the inner side of air supply groove 4 is partitioned into eight sections by adhesive inflow groove 8.

Since adhesive inflow groove 8 partitions bonded surface 11*b* of the housing into a plurality of sections, an area of bonded surface 11*b* of the housing is made relatively small. Accordingly, the adhesive applied to bonded surface 11*b* of the housing spreads easily across bonded surface 11*b* of the housing, thereby preventing occurrence of a problem of deteriorated bonding performance resulting from failure of the adhesive to spread across bonded portion 11 when housing 2 and pad member 1 are bonded to each other.

On an outer side of rectangular air supply groove 4, pad member 1 and housing 2 are bonded to each other with the adhesive interposed therebetween on a bonded surface 12*a* of the pad member and a bonded surface 12*b* of the housing, to form a bonded portion 12. Adhesive inflow groove 7 is formed on the outer side of rectangular air supply groove 4 in the surface of housing 2. As shown in FIGS. 3 and 4, when pad member 1 and housing 2 are bonded to each other at bonded portion 12 on the outer side of air supply groove 4, adhesive inflow groove 7 can be formed between bonded portion 12 and air supply groove 4 on the outer side of air supply groove 4.

For example, if an interval between air supply groove 4 and a peripheral wall of the recess formed in the surface of housing 2 shown in FIGS. 3 and 4 is equal to or greater than twice the width of air supply groove 4, adhesive inflow groove 7 can be formed in order to prevent entry of excessive adhesive applied to bonded portion 12 into air supply groove 4. Although adhesive inflow groove 7 is formed only on the left and right sides in the drawing in the example of FIG. 4, if a bonded portion is provided also on the outer side of air supply groove 4 on the upper and lower sides in FIG. 4, an adhesive inflow groove is formed also on the outer side of air supply groove 4 on the upper and lower sides in FIG. 4.

Adhesive inflow grooves 7 and 8 are formed along air supply groove 4. That is, in the vicinity of air supply groove 4, adhesive inflow grooves 7 and 8 are formed such that directions in which air supply groove 4 extends and directions in which adhesive inflow grooves 7 and 8 extend are substantially the same (i.e., air supply groove 4 is substantially parallel to adhesive inflow grooves 7 and 8). As shown in FIG. 4, for example, adhesive inflow groove 7 is formed at a distance 9 from air supply groove 4. Adhesive inflow groove 7 can be formed such that the interval between adhesive inflow groove 7 and air supply groove 4 (i.e., a dimension of distance 9 in a width direction) is equal to or smaller than the width of air supply groove 4. By forming adhesive inflow grooves 7 and 8 along air supply groove 4 in this manner, an area of bonded portions 11 and 12 can be made larger, thereby preventing occurrence of separation between housing 2 and pad member 1.

As described above, since adhesive inflow grooves 7 and 8 are formed between bonded portions 11, 12 and air supply groove 4 in this hydrostatic bearing pad, excessive adhesive running off from bonded portions 11 and 12 when pad member 1 and housing 2 are bonded to each other flows into adhesive inflow grooves 7 and 8. As a result, entry of the adhesive into air supply groove 4 during bonding between pad member 1 and housing 2 can be prevented to avoid deterioration in performance of the hydrostatic bearing pad, thus obtaining stable bearing performance.

In addition, since air supply groove 4 is formed in a manner corresponding to the arrangement of air supply holes 3 in pad member 1, an area of air supply groove 4 for supplying the compressed gas to pad member 1 is small in the surface of housing 2 contacting pad member 1. Moreover, adhesive inflow grooves 7 and 8 are formed along air supply groove 4. Therefore, bonded portions 11 and 12 having a large area can be ensured, thereby preventing occurrence of separation between housing 2 and pad member 1 during operation of the hydrostatic bearing pad.

Figure 5:
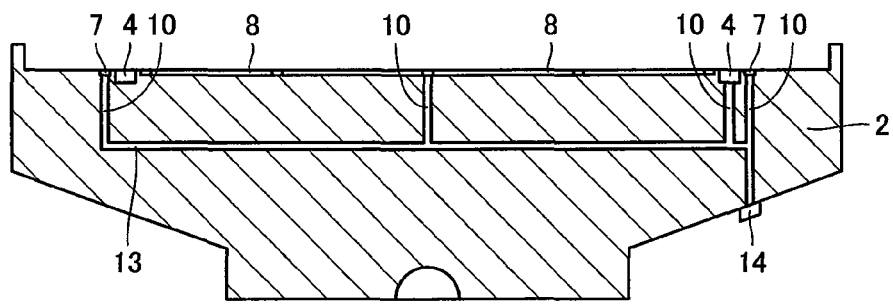
FIG. 5 is a cross-sectional view of the housing along a line V-V in FIG. 4.

FIG. 5 is a cross-sectional view of the housing along a line V-V in FIG. 4. As shown in FIGS. 4 and 5, adhesive inflow grooves 7 and 8 are provided with an exhaust hole 10. At least one exhaust hole 10 may be provided in each of adhesive inflow grooves 7 and 8. Exhaust hole 10 is in communication with an exhaust hole 13 formed in housing 2. Exhaust hole 13 is further formed to reach the rear side of housing 2. An opening of exhaust hole 13 on the rear side of housing 2 has been tapped. A bolt 14 as a sealing body is screwed into the above-described opening of exhaust hole 13. Bolt 14 is provided to close the opening of exhaust hole 13 formed on the rear side of housing 2.

At the time when bonding pad member 1 and housing 2 to each other, bolt 14 is not attached to the opening of exhaust hole 13. Exhaust hole 13 is in communication with exterior space at the opening on the rear side of housing 2. Accordingly, in bonding pad member 1 and housing 2 to each other, air can be exhausted to the outside from adhesive inflow grooves 7 and 8 through exhaust holes 10 and 13, thereby preventing occurrence of a problem of deteriorated bonding performance between pad member 1 and housing 2 resulting from reduction in bonded area where the adhesive is applied to bonded portions 11 and 12 due to bubbles formed by air remaining in the bonded portions.

After bonding pad member 1 and housing 2 to each other, bolt 14 is screwed into the tapped opening of exhaust hole 13, to shut off exhaust hole 13 from outside. In other words, adhesive inflow grooves 7 and 8 are not in communication with the exterior space. Accordingly, leakage of the adhesive to the outside can be prevented, and introduction of foreign objects such as debris into the hydrostatic bearing pad from outside through exhaust holes 10 and 13 can also be prevented.

The sealing body functioning as a stopper of the opening of exhaust hole 13 is not limited to bolt 14. For example, the opening of exhaust hole 13 may be filled with a sealing member such as resin so that it is closed after pad member 1 and housing 2 are bonded with each other, thus shutting off exhaust hole 13 from the exterior space.

Figure 6:
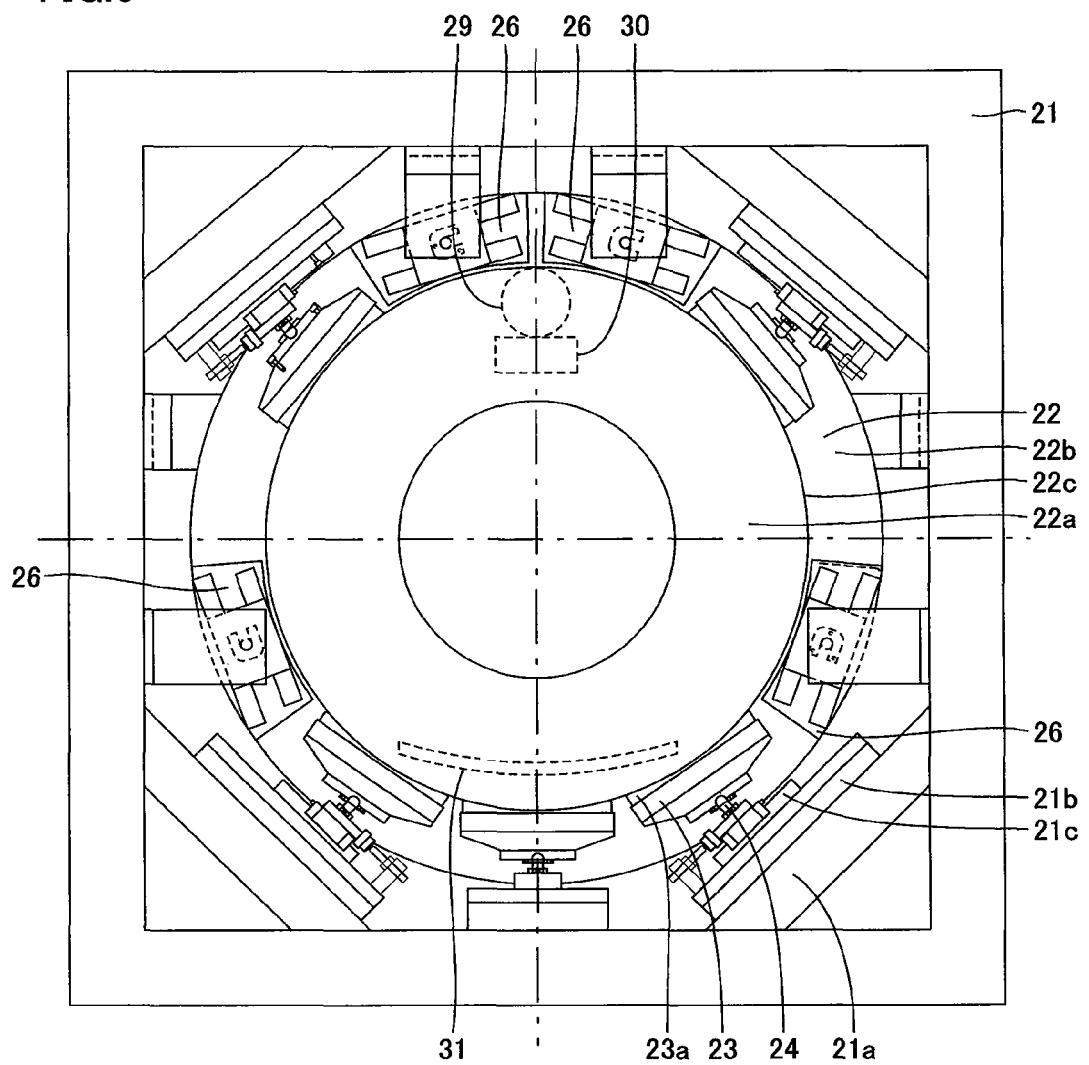
FIG. 6 schematically shows a structure of a CT scanner.

An example of a rotator employing the above hydrostatic bearing pad will now be described. FIG. 6 schematically shows a structure of a CT scanner as an example of the rotator. As shown in FIG. 6, the CT scanner includes a non-rotating part 21 and a rotating shaft 22 serving as a rotor. A table support 21a is set on each of four corners of non-rotating part 21. A plurality of hydrostatic bearing pads 23 radially supporting rotating shaft 22 are each assembled onto a linear motion guide 21c fixed on a table base 21b set on table support 21a which is set in an inclined manner, so that they are movable along linear motion guide 21c.

Rotating shaft 22 includes a protrusion protruding toward the front of the drawing, which is constituted of a tip end surface 22a and an outer circumferential surface 22c. Outer circumferential surface 22c of the protrusion has a cylindrical shape extending in a direction of an axis of rotating shaft 22. A base of the protrusion is fixed to an annular bearing race 22 formed like a flange. Rotating shaft 22 is constituted of the protrusion and bearing race 22b.

Rotating shaft 22 is supported by the plurality of hydrostatic bearing pads 23 fixed to non-rotating part 21. Hydrostatic bearing pad 23 radially supports rotating shaft 22 around outer circumferential surface 22c of the protrusion. That is, the compressed gas supplied from outside is ejected from the narrowed opening at the tip of air supply hole 3 toward outer circumferential surface 22c of the protrusion of rotating shaft 22. The bearing surface of pad member 1 of hydrostatic bearing pad 23 has a radius of curvature identical to that of outer circumferential surface 22c or larger than that of outer circumferential surface 22c by a bearing clearance between pad member 1 and outer circumferential surface 22c.

The high-pressure compressed gas supplied to the bearing clearance between pad member 1 of hydrostatic bearing pad 23 and outer circumferential surface 22c forms a fluid film in the bearing clearance, to form a hydrostatic gas journal bearing for supporting a load with that fluid film. The hydrostatic gas journal bearing radially supports rotating shaft 22 in a non-contact manner.

As shown in FIG. 6, hydrostatic bearing pads 23 are arranged on five locations on outer circumferential surface 22c of rotating shaft 22, with three hydrostatic bearing pads 23 being arranged on the lower side of rotating shaft 22 and two hydrostatic bearing pads 23 being arranged on the upper side. With such arrangement of more hydrostatic bearing pads 23 in a direction of the action of gravity of rotating shaft 22 and an object mounted on rotating shaft 22, the load of rotating shaft 22 can be supported efficiently by a minimum number of hydrostatic bearing pads 23. In addition to adjustment of arrangement of hydrostatic bearing pads 23, adjustment of other specifications of hydrostatic bearing pad 23 such as a diameter and the number of air supply holes 3 can also achieve the similar effect of supporting the load of rotating shaft 22 efficiently by a minimum number of hydrostatic bearing pads 23.

When linear motion guide 21c is rectilinearly reciprocated, a ball stud 24 fixed to linear motion guide 21c is also moved, which moves hydrostatic bearing pad 23 as well. Linear motion guide 21c functions as a moving member for moving hydrostatic bearing pad 23 radially supporting rotating shaft 22. Linear motion guide 21c moves hydrostatic bearing pad 23 in a direction orthogonal to a direction connecting the center of rotation of rotating shaft 22 and ball stud 24 with each other. Thus, upon movement of hydrostatic bearing pad 23, a distance between the center of rotation of rotating shaft 22 and ball stud 24, i.e., the bearing clearance, is varied as well. In hydrostatic bearing pad 23, an amount of movement adjustment by which hydrostatic bearing pad 23 is moved by linear motion guide 21c is larger than an amount of variation in the bearing clearance. Therefore, fine adjustment of the amount in the bearing clearance in the radial direction of rotating shaft 22 can be made accurately.

Further, rotating shaft 22 is axially supported by a plurality of hydrostatic bearing pads 26 at bearing race 22. A plurality of hydrostatic bearing pads 26 are set on the front surface of bearing race 22b shown in FIG. 6 and on a not-shown opposite surface of bearing race 22b, respectively, opposite to bearing race 22b. A bearing surface of hydrostatic bearing pad 26 opposite to bearing race 22b is formed as a plane.

Compressed air is supplied to hydrostatic bearing pads 26, and ejected toward the both surfaces of bearing race 22b of rotating shaft 22. The compressed gas supplied to a bearing clearance between a pad member of hydrostatic bearing pad 26 and bearing race 22b forms a hydrostatic gas thrust bearing. The hydrostatic gas thrust bearing axially supports rotating shaft 22 in a non-contact manner.

A CT scanner for medical diagnosis has a prescribed examination region where an imaged object is arranged. For example, a radiation source 29 such as an X-ray tube produces a radiation beam. The radiation beam is parallelized when passing through a collimator/shutter assembly 30. The radiation beam is applied to a radiation detector 31 in the form of a thin sector arranged oppositely across the examination region. During imaging, radiation source 29 rotates around the examination region while emitting the radiation beam, and the radiation beam (X-ray, for example) passing through the imaged object (a patient in the examination region, for example) is incident upon radiation detector 31, so that data such as intensity of that radiation beam is collected. The above radiation source 29, collimator/shutter assembly 30, and radiation detector 31 are generally mounted on tip end surface 22a of the protrusion of rotating shaft 22, with radiation source 29 and collimator/shutter assembly 30 being arranged opposite to radiation detector 31. That is, rotating shaft 22 rotates, with radiation source 29 and the like as mounted objects being mounted on tip end surface 22a.

As such, rotating shaft 22 is axially and radially supported in a non-contact manner by the hydrostatic bearing pads, which allows silent high-speed operation of rotating shaft 22. Further, rotating shaft 22 will have no worn part owing to the non-contact support, and is thus maintenance-free. In hydrostatic bearing pads 23 and 26, separation between housing 2 and pad member 1 can be prevented and entry of the adhesive into air supply groove 4 can also be prevented, thereby obtaining stable bearing performance.

While the hydrostatic bearing pad supports the rotating shaft of the CT scanner in the above description, the hydrostatic bearing pad according to the present invention is applicable to any hydrostatic bearing pad employed in a non-contact supporting part of another rotator including a large-sized rotor or of a rectilinear guide part. Moreover, while the bearing surface of the hydrostatic bearing pad fixed to the non-rotating part is arranged opposite to the rotating part to support the rotating part in a non-contact manner in the above example, the structure may be such that the hydrostatic bearing pad is fixed to the rotating part and arranged opposite to an annular wall surface of the non-rotating part, to radially support the rotating part.

Furthermore, while air supply groove 4 and adhesive inflow grooves 7, 8 are formed only in the same plane of the bottom surface of the recess formed in housing 2, the structure of the hydrostatic bearing pad according to the present invention is not limited as such. Air supply groove 4 and adhesive inflow grooves 7, 8 may be formed in the surface of pad member 1 contacting housing 2, and in that case, exhaust hole 10 may be formed in positions opposite to adhesive inflow grooves 7 and 8 in the surface of housing 2 contacting the pad member. In addition, air supply groove 4 may be formed in a wall surface of the recess formed in the surface of housing 2 instead of in the bottom surface thereof, and in that case, the adhesive inflow grooves may be formed in any one of the bottom surface and the wall surface of that recess. In other words, the adhesive inflow grooves may be formed in any of the bottom surface and the wall surface of the recess, which are continuous with the surface where housing 2 and pad member 1 are bonded to each other.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The hydrostatic bearing pad according to the present invention is applicable particularly advantageously to a hydrostatic bearing pad used in a rotating gantry supporting part of a CT scanner in the field of medical diagnostic imaging, in a table supporting part of a working machine and a measurement apparatus, and the like.

The invention claimed is:

1. A hydrostatic bearing pad for supporting a rotor with hydrostatic pressure of compressed gas, comprising:
   a pad member including a bearing surface forming a hydrostatic bearing;
   a housing bonded to said pad member with an adhesive;
   an adhesive inflow groove being formed between a bonded portion where a bonded surface of said housing and a bonded surface of said pad member are bonded to each other with said adhesive interposed therebetween; and
   an air supply path for supplying said compressed gas to said pad member, the air supply path being formed at a distance from said adhesive inflow groove,
   wherein, said adhesive inflow groove being formed in at least any one of a surface continuous with a surface of said housing bonded to said pad member and a surface continuous with a surface of said pad member bonded to said housing.

2. The hydrostatic bearing pad according to claim 1, wherein
   said air supply path includes an air supply groove formed in at least any one of the surface continuous with the surface of said housing bonded to said pad member and the surface continuous with the surface of said pad member bonded to said housing.

3. The hydrostatic bearing pad according to claim 2, wherein
   said pad member is a solid body including a plurality of air supply holes formed therein, each extending from said air supply groove to reach said bearing surface.

4. The hydrostatic bearing pad according to claim 2, wherein
   said adhesive inflow groove is formed along said air supply groove.

5. The hydrostatic bearing pad according to claim 1, wherein
   said adhesive inflow groove is formed to partition said bonded portion into a plurality of sections.

6. The hydrostatic bearing pad according to claim 1, wherein
   an exhaust hole for bringing said adhesive inflow groove in communication with exterior space is formed in said housing, and
   said hydrostatic bearing pad further comprises a sealing body for sealing an opening of said exhaust hole to said exterior space.

* * * * *